Patented Mar. 24, 1925.

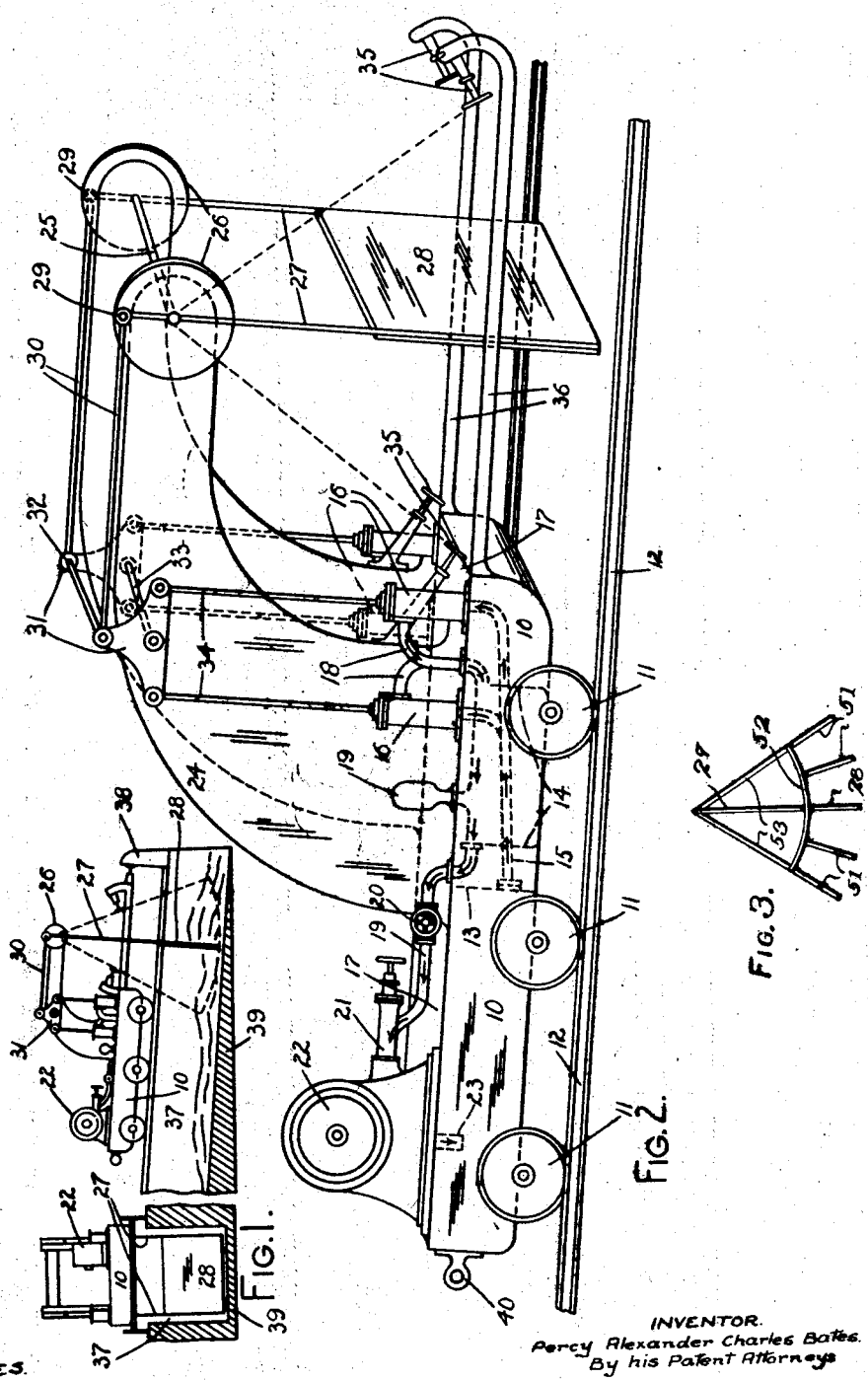

1,531,169

UNITED STATES PATENT OFFICE.

PERCY ALEXANDER CHARLES BATES, OF EASTWOOD, NEAR SYDNEY, NEW SOUTH WALES, AUSTRALIA.

UTILIZATION OF WAVE MOTION.

Application filed July 25, 1921. Serial No. 487,454.

*To all whom it may concern:*

Be it known that I, PERCY ALEXANDER CHARLES BATES, a subject of the King of Great Britain, residing at Eastwood, near Sydney, in the State of New South Wales and Commonwealth of Australia, have invented new and useful Improvements in and Relating to the Utilization of Wave Motion, of which the following is a specification.

This invention relates to the conversion of wave motion into power and has been devised for the efficient utilization of such motion in industry and otherwise.

These improvements in and relating to the utilization of wave motion comprise primarily the harnessing of mechanical devices in various arrangements to the wave motion and connecting said devices to pumps having suction in water and a discharge into a pressure tank or chamber and then supplying said high pressure water to actuate or drive turbines or other suitable fluid engines, According to this invention a vane or vanes on the end of a pendulous lever adapted to be partly submerged in coastal waters are arranged on a pontoon or on a carriage or truck with water tank pressure reservoir with power transmission mechanical gearing pumps and turbine or other water engine and power machines. The pendulous double ended levers carrying one or more vanes or leaves depend from an overhead shaft and the incoming waves and the outgoing backwash cause the vanes to swing to and fro and the upper end of said levers impart reciprocating motion to a crank whence connecting rods operate piston rods of pumps cylinders. Springs from a fast structure are preferably arranged to limit the swing of the vanes.

The pumps in motion force water into a reservoir to store up and concentrate the flow or pressure and thence the water is supplied through a pipe to drive turbines or water wheels which in turn may operate a dynamo or other machine from which power may be easily transmitted.

The pontoon truck or carriage is mounted on a rail on an inclined runway or slope such as an open beach and with or without enclosing concrete training walls and concrete bottom. Said carriage is adapted to be moved up and down the inclined runway in harmony with the tides so as to allow of constant depth of vane in the waves. The inclined runway or slope however might be constructed over an open cut or race into which the incoming waves have access and in which the vane or vanes are part submerged. And the sides and walls inclined or otherwise of the cut or race may be in solid rock and be lined with cement concrete or be built entirely of cement concrete.

In order that this invention may be readily carried into practical effect the preferred mechanical arrangement therefor will now be described with reference to the drawings accompanying and forming part of this complete specification.

The figures are all more or less schematic and Fig. 1 shows transverse and side sectional views of a wave motor embodying present improvements wherein a depending vane reciprocates in a water race and Fig. 2 a perspective view of same motor on a larger scale. Fig. 3 illustrates an alternative form of wave vane or pad.

Referring to Fig. 1 a pontoon 10 is mounted upon draught wheels 11 which travel upon rails 12 laid upon an inclined way or base constructed say of cement concrete and inclining from high land into the sea say preferably at such an angle that the pontoon will have slight downward movement thereon and as near as may be approximately the natural slope of a sea beach.

The pontoon 10 is divided internally into a water tank 13 and a pressure reservoir 14 indicated by dotted lines in Fig. 2. The tank 13 is connected by suction pipe 15 to vertical pump or pumps 16 affixed on the pontoon deck 17 and from which pump or pumps a delivery pipe 18 leads to reservoir tank 14 which is fitted with an air chamber 19 and if required with a relief valve (not shown). Discharge pipe 20 with control valve 21 therein leads from reservoir 14 to the jet or inlet port 21 of a turbine or water motor 22 of more or less ordinary construction also affixed on the pontoon deck 17 and exhaust pipe 23 from said turbine 22 leads back into the tank 13.

Side cheeks or brackets 24 extend upwardly and outwardly from the deck 17 and near their overhanging forward ends have bearings for a transverse shaft 25 on whose ends are crank discs 26 and outwardly again of these are fulcrumed thereon levers 27 whose lower ends carry the vane 28 (in this case a single rectangular and flat leaf) and whose upper ends each connect to a crank pin 29 on disc 26. A connecting rod 30 leads from each said crank pin 29 to one of a pair of oscillating beams 31 connected by a stay rod 32. These beams 31 are on shaft 33 which has bearings in the side cheeks 24 and to each end of them the pump plungers 34 are jointed. Spring buffers 35 protrude from the forward edge of the cheeks 24 and intrude from the returned ends of extension bars 36.

In operating the pontoon 10 is lowered down the inclined railway 12 by a winch or any other suitable means or in the manner hereinafter described until the vane 28 is immersed in the water to the desired depth. The incoming waves as they approach the shore swing the vane 28 rearwardly while the backwash return thereof swings said vane 28 forwardly as a pendulum, and excessive swing of the vane 28 is prevented by its contact with the swing buffers 35 at either end of its permitted stroke. The swinging reciprocating motion of the levers 27, whatever its extent, by means of connecting rods 30 rock the beams 31 to operate the pistons of alternate sets of the pumps 16 which force water from the tank 13 into the reservoir chamber 14 under high pressure, as regulated by control valve 21. The high pressure fluid passed by pipe 20 to the jet or jets of the turbine 22 operates it from whence power may be transmitted either by direct drive or by gear or by belt or otherwise to a dynamo or to any other machine requiring power.

The pontoon described may be installed as described in the open although as shown in Fig. 1 it may be mounted over an open cut or race 37 for the operating thereon of the vane 28 and in such case at the end of said cut or race 37 an abutment 38 to limit the movement downwardly of said pontoon 10 is provided. This cut or race 37 may have its sides and walls of solid rock and be unlined or otherwise be lined with cement concrete, or it may be built entirely of cement concrete and the floor or bottom 39 would be preferably sloped as an imitation of an ocean beach. If the walls of the cut or race 37 be moderately high the wave motor or machine may need to be removed only from its rails in exceptionally rough weather though it would preferably automatically travel on said rails according to the tide level. And further when an open cut or race 37 is used the pumps 16 and their operating mechanism may be placed at the side of the pontoon 10 or otherwise be so arranged as to shorten the length of levers 27.

In order to provide the most effective working of the wave motor the vane 28 is required to be submerged and to be in constant contact with and to an even extent at all times in the water and therefore the pontoon 10 should travel down and up the inclined way 12 in harmony with the tides. This movement may take place in any suitable manner and one way of accomplishing this is to place a draft hook 40 on the pontoon 10, so that the pontoon may be moved along the rails 12.

The modified construction of multiple vane 28 shown in Fig. 3 has two pads or vanes 51 affixed to an arcuate member 52 reinforced by bars 53.

Enclosing concrete training walls may be if desired constructed at one or on both sides of the runways of the pontoons or trucks to concentrate and or direct the waves.

In some cases as in very rough weather though only very exceptionally when a cut or race with high side walls is provided for the wave vane the pontoons and trucks may be advisedly drawn landward clear of the waves.

What I claim as my invention and desire to secure by Letters Patent is:—

1. In an apparatus for utilizing wave power, a runway into which water from the sea may flow, walls at the sides of the runway having their tops above the water line, tracks on the tops of said walls, a carriage mounted on said tracks and movable seaward and landward, a vane pivotally mounted on said carriage for movement in a vertical plane in the runway and between said walls, and members driven by said vane.

2. An apparatus as claimed in claim 1 in which said members consist of links actuated by said vane, rocking cross-heads supported by the carriage and actuated by said links, and rods actuated by the cross-heads.

3. An apparatus as claimed in claim 1 in which the carriage includes a pontoon, and in which the rails are inclined downwardly toward the sea.

4. An apparatus as claimed in claim 1 in which the carriage is provided with overhanging brackets projecting seaward, a horizontal shaft supported by said brackets, double armed levers connected to said shaft and to said vane, and cranks mounted on said shaft and connected to said members.

5. In combination, supporting rails arranged on an incline and extending from the shore toward the sea, the lower ends of said rails being arranged above the water line, supporting wheels mounted on said rails, a pontoon mounted on said supporting wheels and provided with overhanging brackets extending seaward, a horizontal shaft supported by said overhanging brackets, double-armed levers connected to said shaft, a vane carried by said levers and operating in the sea between said rails, links connected to the upper ends of said levers, pivotally mounted cross-heads connected to said links, and rods connected to said cross-heads.

In testimony whereof I have signed my name to this specification in the presence of two subscribing witnesses.

PERCY ALEXANDER CHARLES BATES.

Witnesses:
C. BURNES,
M. SLADEN.